United States Patent [19]

Taylor

[11] 4,223,077
[45] Sep. 16, 1980

[54] NA+-CONDUCTING GLASS, GLASS-CERAMIC AND CRYSTALLINE CUBIC COMPOSITION

[75] Inventor: Barry E. Taylor, Youngstown, N.Y.

[73] Assignee: E. I. Du Pont de Nemours and Company, Wilmington, Del.

[21] Appl. No.: 54,224

[22] Filed: Jul. 2, 1979

[51] Int. Cl.$^2$ .......................................... H01M 10/39
[52] U.S. Cl. .............................. 429/191; 204/195 M; 204/195 G; 204/195 S; 252/520; 252/521; 429/193
[58] Field of Search .......... 204/195 G, 195 M, 195 S, 204/242, 59 AM; 429/33, 191, 193, 104; 252/520, 521

[56] References Cited

U.S. PATENT DOCUMENTS

| | | | |
|---|---|---|---|
| 3,829,331 | 8/1974 | Tsang | 429/104 |
| 4,042,482 | 8/1977 | Shannon et al. | 204/242 |
| 4,052,532 | 10/1977 | Tannenberger et al. | 429/33 |
| 4,146,684 | 3/1979 | Fischer et al. | 429/191 |

OTHER PUBLICATIONS

Maksimov et al., "Hydrothermal Crystal . . . Yttrium Siliacates", Soviet Physics, *Crystallography*, vol. 14, No. 3, Nov.–Dec., 1969, pp. 407–410.
Maksimov et al., "Crystal Structure of . . . Na$_5$YSi$_4$O$_{12}$", Sov. Phys.–Dokl., 18, No. 12, Jun., 1974, pp. 763–765.
Mondal et al., "The Crystal Structure of Tricalcium Aluminate", Acta. Cryst., B31, 1975, pp. 689–697.

*Primary Examiner*—Arthur C. Prescott

[57] ABSTRACT

Na+-conducting glass and glass-ceramic of the composition comprising aNa$_2$O, bSiO$_2$, cM$_2$O$_3$, dM'O$_2$ and eM"O wherein, based on the combined molar amounts totaling 100%, a is 32–41 mole %, b is 50–58 mole %, the ratio a/b is 0.575/1 to 0.760/1, c is 0–8 mole %, d is 0–7 mole %, e is 0–17 mole %, 2c+d+e is at least 8.7 mole %, M is one or more elements selected from the group consisting of the rare earth elements, yttrium and iron, M' is Zr or Hf and M" is Mg, Ca, Sr or Ba, Na+-conducting composition having the substantially cubic crystalline structure of the formula Na$_{9-x-n-z/2}$M$_{1+x/3-2y-n-z/2}$M'$_{y+n}$M"$_{y+z}$Si$_6$O$_{18}$ wherein M, M' and M" are as defined above, x is 0 to 1.5, y is 0 to 0.5, z is 0 to 2.0, n is 0 to 0.5, y+n≦0.5 and y+z≦2.0 and the use of said glass, glass-ceramic and crystalline cubic material as a solid electrolyte.

56 Claims, 2 Drawing Figures

NA+-CONDUCTING GLASS, GLASS-CERAMIC AND CRYSTALLINE CUBIC COMPOSITION

DESCRIPTION

Technical Field

This invention relates to Na$^+$-conducting glass, to crystallized and partially devitrified variations thereof, to crystalline cubic compositions and to the use of these materials as solid electrolytes.

Background Art

Solid ionic conductors with Na$^+$ as the mobile species are desirable for use as solid electrolytes in a number of electrochemical applications.

The use of sodium as the anodic component in high energy-high density secondary, that is, storage, batteries has long been regarded as desirable because sodium is inexpensive, has a high reduction potential and is of light weight. Sodium $\beta$- and $\beta''$-Al$_2$O$_3$ are among the best sodium ion (Na$^+$) conductors with conductivities of the order of $10^{-1}$ ohm$^{-1}$ cm$^{-1}$ at 300° C. and $10^{-2}$ ohm$^{-1}$ cm$^{-1}$ at room temperature.

U.S. Pat. No. 4,097,345 discloses the Na$^+$-conduction of compositions which have the Na$_5$YSi$_4$O$_{12}$ rhombohedral crystal structure with R$\bar{3}$c space group symmetry and are of the formula $$Na_{5-x}\square_xGd_{1-y-x}M_yM'_xSi_{4-z}Ge_zO_{12}$$

wherein

M is at least one of the rare earth elements or yttrium,
M' is Zr$^{+4}$, Hf$^{+4}$, or Th$^{+4}$,
$\square$ is a sodium vacancy to preserve charge neutrality,
x is 0 to about 0.5 when Zr$^{+4}$ or Hf$^{+4}$ is included in M' and 0 to about 0.1 when Th$^{+4}$ is included in M',
y is 0 to 1, and
z is 0 to 4.

Bowen et al., Am. J. Sci., 20, 405 (1930), disclose the preparation of Na$_5$FeSi$_4$O$_{12}$ by making a glass from Na$_2$SiO$_3$, SiO$_2$, and Fe$_2$O$_3$ at elevated temperatures and subsequently crystallizing the glass.

Goodenough et al. (Mat. Res. Bull. 11, 203 (1976) and U.S. Pat. No. 4,049,891) disclose that Na$_3$Zr$_2$PSi$_2$O$_{12}$ and related compositions are good Na$^+$ conductors and Shannon et al., Inorg. Chem. 17, 958 (1978) disclose that at 200° C. the conductivities of Na-$\beta$Al$_2$O$_3$, Na$_3$Zr$_2$Si$_2$PO$_{12}$ and Na$_5$GdSi$_4$O$_{12}$ are comparable. The ionic conductivity of such materials also is discussed by Shannon et al. in Mat. Res. Bull., Vol. 12, pp 969–973, 1977.

U.S. Pat. No. 3,476,602 discloses a Na-S secondary battery in which the solid electrolyte consists of fine hollow fibers of materials such as glass and glass-ceramics. Silicate glasses of the formula Na$_2$O.3SiO$_2$, borate glasses of the type Na$_2$O.2B$_2$O$_3$ and containing a minor amount of NaF, NaCl or NaBr, and borosilicate glasses of the type 2Na$_2$O.4SiO$_2$.B$_2$O$_3$ have been proposed for such use. Such glasses may be susceptible to cracking and pitting, either of which greatly reduces the operating life of the battery. The highest conductivities reported for these silicate and borosilicate glasses suggested for use as hollow fibers in the Na-S battery are of the order $10^{-3}$ ohm$^{-1}$ cm$^{-1}$ at 300° C.

Solid electrolytes are also useful, for example, in the electrowinning of sodium metal from a dissociable molten salt such as NaCl-AlCl$_3$. Na$^+$ ions are electrically transported from the molten salt through the solid electrolyte and converted to elemental sodium at the cathode. In purifying sodium contained in a molten alloy, such as sodium amalgam or other source of impure sodium, sodium ions are produced at the anode and are electrically attracted through a solid electrolyte. The ions are then deposited at the cathode as pure elemental sodium.

The use of solid electrolytes in primary batteries and particularly in completely solid state batteries offers special advantages such as long shelf life, broad temperature limits of operability and miniaturization. Moreover, Na$^+$-conducting solid electrolyte provides a lighter and lower cost alternative to solid state batteries which rely on the transport of Ag$^+$ in various silver halides.

It is an object of this invention to provide a Na$^+$-conducting glass which can be converted readily into shaped structures. Another object is to provide a Na$^+$-conducting glass-ceramic, that is, a glass-crystalline material, having a rhombohedral or cubic crystalline phase. Still another object is to provide a Na$^+$-conducting cubic crystalline phase. A further object is to provide a solid electrolyte of any of the aforesaid materials. Still another object is to provide an electrochemical device, such as a galvanic cell, employing as the solid electrolyte therein any of the aforesaid materials. Other objects will become apparent hereinafter.

DISCLOSURE OF INVENTION

For further comprehension of the invention, and of the objects and advantages thereof, reference may be made to the following description and accompanying drawings, and to the appended claims in which the various novel features of the invention are more particularly set forth.

The present invention resides in Na$^+$-conducting glass of the composition comprising aNa$_2$O, bSiO$_2$, cM$_2$O$_3$, dM'O$_2$ and eM"O wherein, based on the combined molar amounts totaling 100%, a is 32–41 mole %, b is 50–58 mole %, the ratio a/b is 0.575/1 to 0.760/1, c is 0–8 mole %, d is 0–7 mole %, e is 0–17 mole %, 2c+d+e is at least 8.7 mole %, M is one or more elements selected from the group consisting of the rare earth elements, yttrium and iron, M' is Zr or Hf and M" is Mg, Ca, Sr, or Ba. By rare earth element is meant an element having an atomic number of 57–71 in the Periodic Chart of the Elements. Although the sum of the molar amounts of the components essential to the formation of the glass of this invention is 100%, it is to be understood that the glass may contain one or more non-essential ingredients so long as the nonessential ingredient does not substantially deleteriously affect the physical and chemical properties of the glass, particularly its Na$^+$-conducting characteristics.

The invention herein also resides in glass-crystalline (glass-ceramic) material of the aforesaid composition, that is, a material having crystalline characteristics, which material exhibits a higher Na$^+$-conductivity and superior mechanical properties, as compared to the parent glass.

The crystalline phase of the glass-crystalline material includes those with the rhombohedral R$\bar{3}$c space group and formula of the type Na$_5$MSi$_4$O$_{12}$ (disclosed in the aforesaid U.S. Pat. No. 4,097,345) and those with the cubic space group, believed to be Pa3, and formula of the type $$Na_{9-x}M_{(1+\frac{x}{3})}Si_6O_{18}$$

(as more fully described hereinafter) wherein x is 0 to 1.5. The substantially cubic crystalline material of the invention is a novel composition.

The invention herein also resides in the use of the aforesaid glass, glass-crystalline and crystalline cubic materials as a solid electrolyte. By means of the present invention, it is possible to fabricate ceramic electrolytes having shapes heretofore unattainable or attainable only with great difficulty. Shaped structures which are attainable by means of the present invention include thin membranes, flat plates or sheets, corrugated sheets, hollow fibers, tubes and bottole-like structures or containers that, for example, can contain a liquid sodium anode.

The starting materials used to make the glass are, generally, the carbonate, bicarbonate or nitrate of sodium, the oxides or carbonates of M, M' and M'', and SiO$_2$. These materials are uniformly mixed, for example, either with a pestle in an agate mortar or in a suitable mill jar, and then heated, for example, in a platinum crucible or dish, at a temperature in the range of about 1100°–1400° C. until a clear glass is obtained, maintained at this temperature for at least ½ hour, usually for no longer than 16 hours, and then quenched, for example, by placing the crucible or dish in cold water or by pouring the glass onto a metal plate. In general, the M' and M'' oxides tend to raise the glass formation temperature within the 1100°–1400° C. range. If desired, the glass can be fabricated directly into a bar, on which conductivity data can be determined, or into the shaped structure necessary to its use as a solid electrolyte. The glass of this invention typically has a Na+ conductivity of 10$^{-4}$ ohm$^{-1}$cm$^{-1}$ at 200° C. and 10$^{-3}$ ohm$^{-1}$cm$^{-1}$ at 300° C. The glass with a composition such that the number of moles of Na, (M+M'+M''), and Si are approximately in the ratio of 9:1:6, for example, the composition of about 41 mole percent Na$_2$O, about 4.5 mole percent M$_2$O$_3$ and about 54.5 mole percent SiO$_2$ (and equivalent compositions, such as that having about 39.1 mole percent Na$_2$O, about 52.5 mole percent SiO$_2$, about 4.35 mole percent ZrO$_2$ and about 4.35 mole percent MgO), exhibits the highest Na+ conductivity and is preferred. The glass with a composition such that the number of moles of Na, (M+M'+M''), and Si are approximately in the ratio of 5:1:4, for example, the composition of about 35–36 mole % Na$_2$O, about 57–57.2 mole % SiO$_2$, about 6.4–7.2 mole % M$_2$O$_3$ and up to about 1.5 mole % M'O$_2$ is also a useful embodiment. Glasses which are intermediate in composition between 9:1:6 and 5:1:4 likewise represent useful embodiments of this invention.

It has also been discovered that a high conductivity glass can be obtained by admixing NaF and the powdered glass of this invention, in a molar ratio of NaF/glass of up to 1/5, that is, up to 0.2 mole of NaF per 1 mole of powdered glass, and heating and quenching the resultant mixture to form a glass containing dissolved NaF.

By heating the glass of this invention at an elevated temperature, it can be crystallized to form a composite glass-crystalline product, that is, a glass-ceramic, with even higher Na+ conductivitites and improved mechanical properties, as compared to the parent glass. Thus, another feature of the glass of this invention is that it can be fabricated readily into the shape desired for use as a solid electrolyte, which shaped structure, after devitrification, exhibits a conductivity one to two orders of magnitude greater than that of the glass. Such a conductivity is of the same order of magnitude as that exhibited by a comparable crystalline material which is produced by conventional solid state techniques but is not amenable to fabrication into a shaped structure as is the invention product.

Devitrification of the glass can be achieved, for example, by heating either glass which has been fabricated in the desired shape or pressed glass which has been made by comminuting the glass and compressing the resultant powder into the desired shape. In order to obtain a crystalline phase of a given composition it is desirable to make the glass so that it contains the necessary constituents in such amounts that correspond to the stoichiometry of the desired crystalline phase. The degree of crystallization which occurs during heating depends on the temperature and time. In general, a temperature within the range 700°–1100° c. and a time of 1–16 hours provide sufficient devitrification to increase the Na+-conductivity appreciably. However, the particular temperature used depends on the composition of the glass and the crystalline phase desired. The glass of this invention can be devitrified in two different Na+-conducting phases, a rhombohedral phase with Na$_5$MSi$_4$O$_{12}$ crystal structure and R$\bar{3}$c space group symmetry, such as disclosed in the aforesaid U.S. Pat. No. 4,097,345, or a cubic phase of the formula Na$_{9-x}$M$_{(1+x/3)}$Si$_4$O$_{12}$ (as more fully described hereinafter) wherein x is 0–1.5, the latter being a novel composition which appears to have a Pa3 space group symmetry. Thus, the formula for the cubic phase can vary from Na$_9$MSi$_6$O$_{18}$ to Na$_{7.5}$M$_{1.5}$Si$_6$O$_{18}$. The rhombohedral Na$_5$MSi$_4$O$_{12}$ structure, wherein the molar ratio of Na:M:Si is 5:1:4, can be formed by devitrifying the glass of this invention having the approximate composition 36 mole % Na$_2$O, 7 mole % M$_2$O$_3$ and 57 mole % SiO$_2$ (referred to either as a 36-7-57 composition or as a 5:1:4 composition). Preferably, the devitrification is carried out at 700°–1050° C. The rhombohedral phase can also be formed when M'O$_2$ is present in the glass composition if, as defined above, d≦2c and e is 0. The rhombohedral phase formula is Na$_{5-x}$M$_{1-x}$M'$_x$Si$_4$O$_{12}$ wherein x is 0 to about 0.5. Although the ratio of Na:(M+M'):Si in such formula is 5-x:1:4, thereby deviating somewhat from the 5:1:4 ratio when M' is absent, it is to be understood that such a rhombohedral composition is included in and is considered to be equivalent to the 5:1:4 or 36-7-57 composition. When an M'O$_2$ component is present, devitrification can be carried out at a higher temperature, for example, 1100° C. (as in Example 5 wherein is produced the rhombohedral Na$_{4.9}$Gd$_{0.9}$Zr$_{0.1}$Si$_4$O$_{12}$), without substantial formation of cubic phase, because the stability of the cubic phase apparently is lowered by the presence of the added component.

The cubic Na$_5$MSi$_4$O$_{12}$ (which can be rewritten as the aforesaid Na$_{7.5}$M$_{1.5}$Si$_6$O$_{18}$ to more clearly indicated the six member silicate ring structure which is believed to be characteristic of the cubic phase) can be obtained from the same glass described above to prepare the rhombohedral structure, that is, the 36-7-57 composition. To obtain the cubic phase, however, the devitrified material must be quenched from a higher temperature than that used to obtain the rhombohedral phase. When it is desirable to convert the glass of this invention, including a composition containing M' and/or M", other than the 36-7-57 composition, to the cubic crystalline structure, conventional heating for 1-16 hours at 700°-1100° C. can be employed.

As already indicated above, devitrifying the glass of this invention does not provide a totally crystalline material, but rather a glass-crystalline material (glass-ceramic), with the degree of crystallinity depending on the conditions of heating. A substantially cubic crystalline material of the formula $$Na_{9-x-n-\frac{z}{2}}M_{1+\frac{x}{3}-2y-n-\frac{z}{2}}M'_yM''_{y+z}Si_6O_{18}$$

wherein M is one or more elements selected from the group consisting of the rare earth elements, yttrium and iron, M' is Zr or Hf and M" is Mg, Ca, Sr, or Ba, x is 0 to 1.5, y is 0 to 0.5, z is 0 to 2.0, n is 0 to 0.5, $y+n \leq 0.5$ and $y+z \leq 2.0$ can be made by using conventional solid state sintering techniques and the same mixture of oxides used to prepare the glass of this invention. Instead of firing the mixture to 1100°-1400° C., however, it is heated to 850°-1150° C. for at least 16 hours. The mixture may be prefired at a lower temperature and, as is well known in the art of solid state preparations, uniformity of product can be promoted by periodically interrupting the heating, in order to grind the material, and then continuing the heating. The cubic phase is readily obtained, in most instances, by heating the mixture at 1000° C. for about 16 hours. When the composition of the mixture is such that the mixture contains approximately 36 mole percent $Na_2O$, 7 mole percent $M_2O_3$ and 57 mole percent $SiO_2$, either the rhombohedral $Na_5MSi_4O_{12}$ structure or the cubic $Na_{7.5}M_{1.5}Si_6O_{18}$ structure can be produced. In such event, it appears that the formation of the cubic $Na_{7.5}M_{1.5}Si_6O_{18}$ phase is favored by employing a higher firing temperature, for example, 1150° C. The rhombohedral phase tends to form at lower temperatures. Any cubic phase material which may form at lower temperatures tends to transform to rhombohedral phase material upon continued heating. The crystal structure of the cubic phase has not been determined. However, the similarities between X-ray single crystal photographs and powder patterns between $Na_9GdSi_6O_{18}$ and $Ca_3Al_2O_6$ suggest that the structures are closely related and both these cubic phases appear to have the Pa3 space group. The cubic cell edge is about 15.2 Å (1.52 nm) for all the cubic phases.

The glass, glass-ceramic, and crystalline cubic material of this invention are useful in an electrochemical device having (a) two electrodes, one of which is a sodium-containing electrode capable of supplying sodium ions, (b) a solid electrolyte separating the two electrodes and (c) an inert electrical connector to complete the electrical circuit between the two electrodes, said solid electrolyte being the aforementioned $Na^+$-conducting glass, glass-ceramic (glass-crystalline) or crystalline cubic material.

As already suggested, the glass, glass-ceramic and crystalline cubic material of this invention are useful as ionic conductors which pass a current of $Na^+$. The materials can be used in batteries which operate at elevated temperatures with molten sodium as the anode source of sodium ions or in completely solid state primary batteries in which the anode consists of sodium metal, sodium-amalgam, or sodium tungsten bronzes. In a high temperature battery the cathode may consist of liquid sulfur, selenium, or tellurium, any of which may remove sodium ions by forming a composition approaching $Na_2S_4$, or the equivalent selenium or tellurium compound. For a low temperature battery, the cathode may be, for example, $V_2O_5$, bromine, $TiS_2$, or a similar material which may react with, and thereby remove, the $Na^+$ transmitted through the solid electrolyte. Connector electrodes can be used to complete the electrical circuit between the $Na^+$-supplying anode and the $Na^+$-removing cathode. In an all-solid cell, the cell may be encapsulated to prevent reaction of the components with the atmosphere. Completely solid state cells offer the advantages of long shelf life, broad temperature range of operability and miniaturization. The life of these solid electrolytes may be prolonged if the cathode used does not contain sulfur.

The materials of this invention are especially useful in electrowinning of sodium metal or in purifying sodium metal. For electrowinning of sodium metal, the anode may consist of a carbon electrode situated in a dissociable molten salt, such as $NaCl-AlCl_3$. Sodium ions are electrically transported from the molten salt through a solid electrolyte of the composition of this invention and converted to elemental sodium at the cathode. For purifying sodium metal, the anode may consist of an inert connecting electrode situated in a molten alloy, such as sodium amalgam or other source of impure sodium. Sodium ions are produced at the anode and are electrically attracted through the solid electrolyte of the composition of this invention and then deposited at the cathode as pure elemental sodium.

Devices in which electrolytes of the materials of this invention also can be used include coulometers, timers, and other devices which will be obvious to one skilled in the art.

The glass of this invention can be mixed, for example, with a vehicle to form a paste or paint which can be applied to a substrate, such as $Al_2O_3$, dried and heated at a suitable temperature to cause devitrification. The devitrified ionic conductor formed by such a conventional thick-film technique generally is about 2-20 μm in thickness, is adherent to the substrate and can be contacted with appropriate electrode materials to make a thick-film battery. Films made by other techniques but outside the above thickness range will also be useful in such a planar-type battery.

UTILITY

The following experiments demonstrate the utility of the glass and glass-ceramic of this invention. Similar experiments can readily be devised to demonstrate the utility of the substantially cubic crystalline material of the invention.

EXPERIMENT 1

Figure 1:
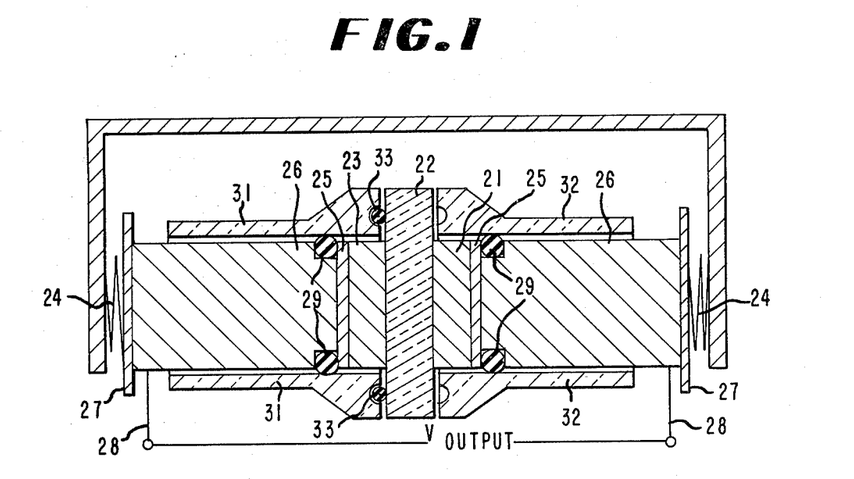
FIG. 1 is an illustrative, cross-sectional view of a sodium-titanium disulfide voltaic cell using a solid electrolyte of this invention.

The rechargeable Na/solid electrolyte (of this invention) $TiS_2$ battery, shown in FIG. 1, was assembled in an argon atmosphere in a dry-box so as to comprise an anode 21 fabricated from nickel sponge and 0.11 g of sodium foil, a solid electrolyte slab of glass 22 0.325 cm thick and approximately of the composition 35.7 mole % Na$_2$O, 7.2 mole % Gd$_2$O$_3$ and 57.1 mole % SiO$_2$, and a solid TiS$_2$ cathode 23 having a diameter of 1.25 cm and a thickness of about 0.2 cm (prepared using conventional techniques).

The titanium disulfide used as the cathode was prepared in the following manner. Titanium metal (2.138 g) and 2.862 g of sulfur were placed in a silica tube which was evacuated to 10$^{-6}$ mm (1.3×10$^{-4}$ Pa) of Hg, sealed, and placed in a furnace. The tube was heated very gradually to 1000° C., held at this temperature for 16 hours, then allowed to cool in the furnace. The resulting product was gold in color and gave an X-ray pattern of pure TiS$_2$.

The anode and cathode were pressed against opposite faces of the solid electrolyte disc by means of springs 24. This pressure was transmitted to the anode and cathode by stainless steel 25 faced brass slugs 26. Seals were provided between the ends of brass slugs 26 and Pyrex glass cell walls (glass sleeves) 31, 32 by means of rubber O-rings 29. The springs were electrically insulated from the brass slugs by glass insulators 27. External electrical connectors 28 were connected to the brass slugs. The sodium-impregnated nickel sponge was 1.19 cm in diameter so that the active area of the sodium in contact with solid electrolyte was 1.11 cm$^2$. The cell was encased in cell walls 31 and 32, one side of which used a rubber O-ring 33 to seal the cell. Cell wall 32 is shown as including the indentation corresponding to that in cell wall 31 wherein O-ring 33 is embedded. The indentation in 32 facilitates escape of trapped air which is released upon melting of sodium in anode 21. The clamped cell in the argon atmosphere dry-box was placed inside an oven.

In the dry-box, a small amount of TiS$_2$ flaky powder was burnished onto the glass electrolyte surface which abuts the TiS$_2$ cathode by using a stainless steel spatula. This burnished film had a smooth, metallic green luster. An additional small amount of TiS$_2$ powder was placed between this film and the disc of TiS$_2$. The cell was reassembled and heated initially to 137° C. An open circuit voltage of 2.36 volts was measured with the sodium electrode negative.

In general, it has been found that, with a fresh battery, cycling about 10$^{-3}$ C (coulomb) of charge back and forth several times appears to "condition" the interfaces between the electrodes and the electrolyte in that the cell impedance decreases significantly and becomes dominated by the resistance of the electrolyte, not the electrodes. The observed cell resistance is approximately that calculated for the electrolyte alone, based on the A.C. conductivity data for the same material.

Figure 2:
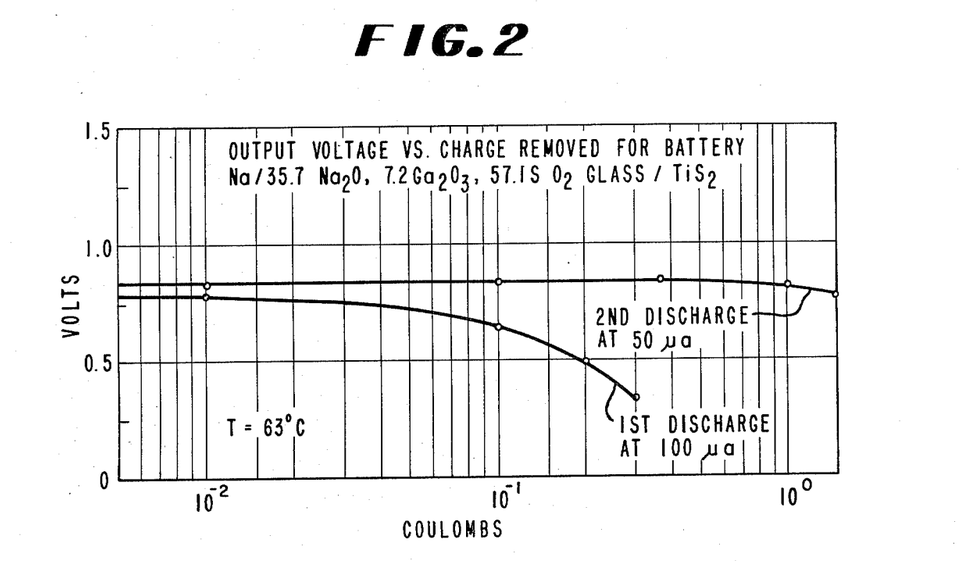
FIG. 2 is a graph on a semi-logarithmic scale of the output voltage vs. charge flow (in coulombs) for one embodiment of the cell illustrated in FIG. 1.

The two discharge/charge cycles of the battery are shown in FIG. 2. The first discharge provided about 0.3 C at a current (i) of 100 μA, the second discharge provided about 1.5 C at a current (i) of 50 μA, at an operating temperature of 163° C.; recharging between discharges was carried out with about 0.5 C at 300 μA. The output voltage was measured with a Princeton Applied Research Model 173 Potentiostat/Galvanostat and the charge was measured with a Princeton Applied Research Model 179 Coulometer.

EXPERIMENT 2

The solid electrolyte in the battery described in Experiment 1 was replaced with a slab of glass (of this invention) 0.335 cm in thickness and approximately of the composition 41 mole % Na$_2$O, 4.5 mole % Gd$_2$O$_3$ and 54.5 mole % SiO$_2$. The battery was heated to 124° C. and an open circuit voltage of 2.36 volts was measured. Two discharge/charge cycles were completed at an operating temperature of 124° C. The first discharge provided about 0.20 C at 40 μA. The battery was then recharged with about 0.06 C at 10 μA. The second discharge provided about 0.05 C at 5 μA.

EXPERIMENT 3

The solid electrolyte in the battery described in Experiment 1 was replaced with a 0.35 cm thick glass-ceramic slab (that is, a glass-crystalline material of this invention) of composition of approximately 35.7 mole % Na$_2$O, 7.2 mole % Gd$_2$O$_3$ and 57.1 mole % SiO$_2$. The glass-ceramic was made as follows. A mixture of 16.80 g of NaHCO$_3$, 7.24 g of Gd$_2$O$_3$, and 9.60 g of SiO$_2$ was placed in a glass jar with plastic balls and shaken therein by hand for about two minutes. The powder was placed in an Al$_2$O$_3$ crucible and calcined at 950° C. overnight. The crucible was cooled to room temperature and then heated to 1350° C. until melted (several hours). The molten glass was poured onto a steel plate and quickly covered with a second steel plate to cool both surfaces. The solid glass was transferred to a 500° C. furnace and the furnace was shut off. This slow cooling annealed the glass. The resultant clear glass was placed on an Al$_2$O$_3$ ceramic sheet and heated to 955° C. (at 100° C./hr), held 1 hour at this temperature and then cooled to room temperature (at 100° C./hr). The sample was now cloudy, indicating that devitrification had occurred. Two discharge/charge cycles were run on the battery at an operating temperature of 165° C. The first discharge provided about 3 C at a current of 10 μA. The battery was then recharged with about 0.75 C at about 200 μA. The second discharge provided approximately 1 C at 2 μA.

EXPERIMENT 4

The following experiment illustrates the use of the Na$^+$-conducting glass and the glass-crystalline material of this invention as a coating on a substrate material.

A mixture of 91.49 g of Na$_2$CO$_3$ (35 mole %), 4.34 g of ZrO$_2$ (1.44 mole %), 7.47 g of Gd$_2$O$_3$ (6.44 mole %) and 84.67 g of SiO$_2$ (57.14 mole %) was heated in a Kyanite ® crucible at 1350° C. until a clear solution was obtained. The molten glass was then poured into water, dried, and comminuted to a fine powder. This powder was dispersed in an organic vehicle (ethyl cellulose in dibutyl Carbitol ® and terpineol), as normally carried out in thick-film operations, to give a paste containing 65% solids and a 35% vehicle by weight. The paste was screen printed in a 19.05 mm × 19.05 mm pattern onto an Al$_2$O$_3$ substrate (Alsimag ®, 96%) using a 200 mesh (U.S. Sieve Series) stainless steel screen. The printed substrate was fired in a belt furnace to 850° C., using a heating rate of 50°–100° C./minute, with a dwell time of 10 minutes at 850° C., followed by cooling at about 100° C./minute. The coated substrate gave an X-ray pattern of predominantly the rhombohedral structure with some impurity (Na$_3$GdSi$_3$O$_9$=20–30%). The coating adhered well to the substrate. When connected to suitable electrodes, such a coating would be useful in thick-film batteries. This ability to apply coatings to suitable substrates by thick-film techniques also makes the glass and glass-ceramic materials of this invention useful in elements for electrochromic display devices. One method which may be envisioned by one skilled in the art for constructing such a device is to apply to an alumina substrate an electrically conductive coating which can also act as a source of mobile cations. This conductive element might be $Na_xWO_3$, $Na_xV_2O_5$ or silver so that the ion-conducting species might be either $Na^+$ or $Ag^+$. The glass (of the invention) solid electrolyte element would be applied by thick-film techniques to the electrically conductive element, then dried and fired to give a devitrified material (glass-ceramic of the invention) with an X-ray diffraction pattern characteristic of the cubic or rhombohedral structure. The glass softens and flows enough during firing to give a dense adherent coating. A thin layer of tungsten trioxide or molybdenum trioxide would then be applied on top of the solid electrolyte layer by vapor deposition or other suitable technique. Tungsten trioxide or molybdenum trioxide has a light yellow color in the uncharged state. Finally, a thin layer of tin dioxide or another transparent electrode material capable of carrying electrical current would be applied to the top tungsten trioxide or molybdenum trioxide surface. When an appropriate electrical field is applied between the bottom and top electrodes, the conducting ions will migrate into the tungsten trioxide or molybdenum trioxide layer and will cause a dark blue coloration by the reaction $$xNa + WO_3 \rightleftarrows Na_xWO_3$$
(yellow)    (blue).

The coloration reaction can be reversed by reversing the polarity of the applied electric field. An advantage of the solid electrolyte glass-ceramic of the present invention is that it can form a dense film which adheres well to a substrate without the aid of a nonconductive binder. Such binders would interfere with the overall conductive efficiency. Crystalline solid electrolytes such as commonly employed in the art, for example, sodium β-alumina and $Na_3Zr_2PSi_2O_{12}$, require firing temperatures 250°–750° C higher than the glass of the invention in order to form a dense ceramic. Furthermore, the crystalline solid electrolytes sodium β-alumina and $Na_3Zr_2PSi_2O_{12}$ do not readily form glasses and, therefore, cannot be processed by the techniques outlined herein.

The following examples demonstrate the preparation of the glass, glass-ceramic and substantially cubic crystalline material of this invention.

EXAMPLE 1

An intimate mixture of 2.900 g of $Na_2CO_3$, 1.109 g of $Gd_2O_3$ and 2.195 g of $SiO_2$ (equivalent to approximately 41 mole % of $Na_2O$, 4.5 mole % $Gd_2O_3$, and 54.5 mole % $SiO_2$) was gradually heated in a platinum crucible to 1010° C and held there for 16 hours and then quenched. The sintered mass was comminuted to a fine powder by milling in an agate planetary mill for 1 hour. The milled sample was heated to 1000° C., held there for 16 hours and then quenched. The sintered mass again was comminuted to a fine powder. The X-ray pattern of this $Na_9GdSi_6O_{18}$ powder can be indexed as cubic with a cell edge of 15.219 A. (1.5219 nm). Some of the product powder was pressed into a disc using a steel die at an approximate pressure of 30,000 psi, ($20.7 \times 10^4$ kPa), heated to 1000° C. for 16 hours and then quenched. The disc was mounted in a stainless steel holder between two discs of sodium foil 0.015 inch (0.381 mm) thick supported on nickel screen. The disc temperature was raised above the melting point of sodium metal to assure good contact. The A.C. conductance was measured using a Wayne-Kerr universal bridge at a frequency of $10^4$ radians/sec. The sample showed a conductivity $\sigma_{200}$ of $3.9 \times 10^{-3}$ ohm$^{-1}$cm$^{-1}$ at 200° C. and a conductivity $\sigma_{300}$ of $1.5 \times 10^{-2}$ ohm$^{-1}$ cm$^{-1}$ at 300° C. The D.C. conductivity was determined by applying slowly varying voltages (triangular wave forms with a frequency less than 0.01 Hz) and recording the current. The D.C. conductivity was calculated from the current-voltage plot. Excellent agreement with the A.C. results was obtained. The pellet was then comminuted to a fine powder which gave the same cubic X-ray pattern, with a cell edge of 15.214 A (1.5214 nm), as found before the final firing. The cubic X-ray pattern for this $Na_9GdSi_6O_{18}$ composition is reflected by the data given in Table I.

TABLE I
X-RAY DIFFRACTION PATTERN OF $Na_9GdSi_6O_{18}$

| h | k | l | D (OBSERVED), nm | INTENSITY (OBSERVED) |
|---|---|---|---|---|
| 2 | 1 | 0 | 0.678324 | 60 |
| 2 | 1 | 1 | 0.619863 | 40 |
| 2 | 2 | 0 | 0.536555 | 10 |
| 3 | 0 | 0 | 0.506373 | 30 |
| 3 | 1 | 1 | 0.458319 | 60 |
| 3 | 2 | 0 | 0.421765 | 25 |
| 3 | 2 | 1 | 0.406565 | 75 |
| 4 | 1 | 0 | 0.368962 | 15 |
| 3 | 3 | 0 | 0.358647 | 15 |
| 3 | 3 | 1 | 0.349046 | 10 |
| 4 | 2 | 0 | 0.340094 | 5 |
| 4 | 2 | 1 | 0.331989 | 55 |
| 4 | 2 | 2 | 0.310757 | 10 |
| 5 | 0 | 0 | 0.303975 | 15 |
| 5 | 1 | 0 | 0.298355 | 10 |
| 5 | 1 | 1 | 0.292979 | 5 |
| 5 | 2 | 0 | 0.282591 | 60 |
| 5 | 2 | 1 | 0.277842 | 60 |
| 4 | 4 | 0 | 0.279050 | 100 |
| 4 | 4 | 1 | 0.264921 | 10 |
| 5 | 3 | 1 | 0.257252 | 10 |
| 6 | 1 | 0 | 0.250154 | 10 |
| 6 | 1 | 1 | 0.246885 | 40 |
| 6 | 2 | 0 | 0.240610 | 10 |
| 5 | 4 | 0 | 0.237705 | 30 |
| 6 | 3 | 0 | 0.226905 | 25 |
| 6 | 3 | 1 | 0.224374 | 10 |
| 4 | 4 | 4 | 0.219709 | 25 |
| 7 | 1 | 0 | 0.215229 | 15 |
| 7 | 1 | 1 | 0.213087 | 5 |
| 7 | 2 | 0 | 0.209085 | 10 |
| 7 | 2 | 1 | 0.207119 | 35 |
| 6 | 4 | 2 | 0.203352 | 10 |
| 7 | 2 | 2 | 0.201561 | 10 |
| 7 | 3 | 1 | 0.198139 | 30 |
| 6 | 5 | 0 | 0.194896 | 15 |
| 6 | 5 | 1 | 0.193304 | 15 |
| 8 | 0 | 0 | 0.190244 | 30 |
| 8 | 1 | 0 | 0.188759 | 30 |
| 8 | 1 | 1 | 0.187313 | 2 |
| 7 | 3 | 3 | 0.185929 | 20 |
| 8 | 2 | 0 | 0.184292 | 5 |
| 8 | 2 | 1 | 0.183129 | 5 |
| 6 | 6 | 0 | 0.179404 | 5 |
| 7 | 5 | 0 | 0.176963 | 5 |
| 7 | 5 | 1 | 0.175731 | 15 |
| 8 | 3 | 2 | 0.173443 | 20 |
| 7 | 5 | 2 | 0.172297 | 20 |
| 8 | 4 | 0 | 0.170138 | 5 |
| 9 | 0 | 0 | 0.169123 | 5 |
| 9 | 1 | 1 | 0.167022 | 5 |
| 0 | 2 | 0 | 0.165008 | 10 |
| 9 | 2 | 1 | 0.164128 | 30 |
| 8 | 5 | 0 | 0.161336 | 5 |
| 9 | 3 | 0 | 0.160418 | 10 |
| 8 | 5 | 2 | 0.157846 | 10 |

EXAMPLE 2

Two solutions were prepared: one containing 100.8 g of $NaHCO_3$, 72.1 g of $SiO_2.nH_2O$ and 2000 ml of $H_2O$, the second containing 25.2 g of $NaHCO_3$, 54.38 g of $Gd_2O_3$ and 2000 ml of $H_2O$. The two solutions were pumped together into a one gallon ($3.785 \times 10^{-3}$ m$^3$) Waring blender and blended. The slurry thus formed was dried overnight under an infrared lamp. The white powder was comminuted to less than 18 mesh (U.S. Sieve Series) in a plastic container using ceramic balls. An additional 14.3 g of $SiO_2$ were added with thorough mixing. This mixture is equivalent to approximately 35.7 mole % $Na_2O$, 7.1 mole % $Gd_2O_3$ and 57.1 mole % $SiO_2$. The mixture was melted in a commonly available RF unit, held at the melt for 30 minutes and then quenched on a stainless steel plate. Some of the glass was melted and fabricated into a bar and its ionic conductivity was found to be: $\sigma_{200} = 5.5 \times 10^{-5}$ ohm$^{-1}$ cm$^{-1}$ and $\sigma_{300} = 6 \times 10^{-4}$ ohm$^{-1}$ cm$^{-1}$.

EXAMPLE 3

An intimate mixture of 45.746 g of $Na_2CO_3$, 28.737 g of $Gd_2O_3$, 2.171 g of $ZrO_2$ and 42.337 g of $SiO_2$ (equivalent to approximately 35 mole % $Na_2O$, 6.5 mole % $Gd_2O_3$, 1.5 mole % $ZrO_2$ and 57 mole % $SiO_2$) was heated (and melted) two times to about 1300° C. in a platinum crucible and held there for a period of 1 hour each time. It was remelted a third time at 1500° C., held there for 2 hours and quenched in a stainless steel tray. The glass was comminuted to a fine powder. A portion of the powder was heated for 12 days at 975° C., quenched, comminuted to a fine powder again and pressed into a disc. The disc was heated to 500° C., held there for 4 hours, then to 1000° C., held there for 16 hours, to effect devitrification, and allowed to cool in the furnace. The conductivity of the disc was found to be: $\sigma_{200} = 1.3 \times 10^{-2}$ ohm$^{-1}$ cm$^{-1}$ and $\sigma_{300} = 1.4 \times 10^{-1}$ ohm$^{-1}$ cm$^{-1}$. The typical rhombohedral-type X-ray diffraction pattern for this $Na_{4.9}Gd_{0.9}Zr_{0.1}Si_4O_{12}$ composition is reflected by the data given in Table II.

TABLE II

X-RAY DIFFRACTION PATTERN OF RHOMBOHEDRAL $Na_{4.9}Gd_{0.9}Zr_{0.1}Si_4O_{12}$

| h | k | l | D (OBSERVED), nm | INTENSITY (OBSERVED) |
|---|---|---|---|---|
| 1 | 1 | 0 | 1.100470 | 10 |
| 2 | 1 | 1 | 0.626226 | 90 |
| 2 | 2 | 0 | 0.551998 | 60 |
| 4 | 1 | 0 | 0.417142 | 50 |
| 3 | 2 | 1 | 0.414530 | 40 |
| 3 | 1 | 2 | 0.406364 | 60 |
| 1 | 1 | 3 | 0.393418 | 50 |
| 2 | 3 | 2 | 0.360605 | 20 |
| 2 | 2 | 3 | 0.335047 | 5 |
| 5 | 1 | 1 | 0.331895 | 30 |
| 0 | 2 | 4 | 0.299856 | 15 |
| 2 | 1 | 4 | 0.289735 | 5 |
| 1 | 6 | 1 | 0.284839 | 10 |
| 3 | 4 | 2 | 0.281773 | 10 |
| 3 | 3 | 3 | 0.277211 | 60 |
| 4 | 4 | 0 | 0.276554 | 100 |
| 1 | 3 | 4 | 0.271475 | 25 |
| 4 | 0 | 4 | 0.263617 | 50 |
| 5 | 3 | 2 | 0.251076 | 10 |
| 0 | 1 | 5 | | |
| 5 | 2 | 3 | 0.247862 | 20 |
| 2 | 6 | 2 | 0.245031 | 5 |
| 0 | 5 | 4 | 0.243403 | 5 |
| 2 | 0 | 5 | | |
| 1 | 2 | 5 | 0.238322 | 15 |
| 2 | 4 | 4 | | |
| 2 | 7 | 1 | 0.230193 | 20 |
| 4 | 4 | 3 | | |
| 8 | 0 | 2 | 0.23768 | 20 |
| 0 | 4 | 5 | | |
| 4 | 3 | 4 | | |
| 7 | 2 | 2 | 0.219234 | 15 |
| 2 | 3 | 5 | | |
| 7 | 3 | 1 | 0.212439 | 15 |
| 9 | 0 | 0 | | |
| 7 | 0 | 4 | 0.206867 | 15 |
| 1 | 1 | 6 | | |
| 4 | 2 | 5 | | |
| 6 | 4 | 2 | | |
| 6 | 5 | 1 | 0.198321 | 20 |
| 7 | 4 | 0 | | |
| 0 | 8 | 4 | 0.190817 | 20 |
| 6 | 1 | 5 | | |
| 9 | 1 | 2 | | |
| 9 | 2 | 1 | 0.186581 | 5 |
| 8 | 2 | 3 | | |
| 8 | 3 | 2 | 0.185926 | 10 |
| 5 | 3 | 5 | | |
| 0 | 7 | 5 | | |
| 3 | 3 | 6 | 0.182718 | 15 |
| 8 | 1 | 4 | | |
| 2 | 6 | 5 | | |
| 0 | 10 | 2 | | |
| 7 | 2 | 5 | 0.171552 | 10 |
| 10 | 1 | 3 | 0.167031 | 15 |

EXAMPLE 4

An intimate mixture of 2.415 g of $Na_2CO_3$, 1.48 g of $Gd_2O_3$ and 2.106 g of $SiO_2$ (equivalent to approximately 36.8 mole % $Na_2O$, 6.6 mole % $Gd_2O_3$ and 56.6 mole % $SiO_2$) was heated in a platinum crucible to 800° C., held there for 16 hours, and then to 980° C., held briefly; the temperature was decreased to 950° C., held there for 7 hours; the mixture was then quenched. The sintered mass was comminuted to a fine powder by milling in an agate planetary mill for 1 hour. The powder was heated to 1000° C., held there for 16 hours, then quenched and ground by hand, using an agate mortar and pestle, to a powder. The X-ray diffraction pattern of this powder is similar to that of the product of Example 1 and can be indexed with a cubic cell edge of 15.171 Å (1.5171 nm). After this powder was milled for an additional 45 minutes, it was pressed into a disc and sintered at 1000° C. for 16 hours. The ionic conductivity of this cubic $Na_{7.8}Gd_{1.4}Si_6O_{18}$ composition was found to be: $\sigma_{200} = 9.6 \times 10^{-4}$ ohm$^{-1}$ cm$^{-1}$ and $\sigma_{300} = 3.8 \times 10^{-3}$ ohm$^{-1}$ cm$_{-1}$.

EXAMPLE 5

In order to determine the effect of heating time on the conductivity of $Na_{4.9}Gd_{0.9}Zr_{0.1}Si_4O_{12}$ glass-ceramic prepared by denitrifying the glass of this invention, 9 discs were pressed using the powdered glass of Example 3, that is, the material resulting from the third (1500° C.) melting in that example. The discs wre heated quickly to 1000° C. and held at this temperature for various lengths of time (1–6 hours), and then allowed to cool in the furnace to avoid cracking of the sintered glass-ceramics. Three different furnaces were used in order to allow for natural variations in heating and cooling rates. These different heating conditions did not effect the conductivities of the products; all samples had a $\sigma_{200}$ of $2.8-4.4\times 10^{-2}$ ohm$^{-1}$ cm$^{-1}$ and a $\sigma_{300}$ of $6.7-10\times 10^{-2}$ ohm$^{-1}$ cm$^{-1}$. Both surfaces of the discs were subjected to X-ray analysis and were found to contain substantially the rhombohedral phase.

EXAMPLE 6

An intimate mixture of 5.900 g of $Na_2CO_3$, 2.092 g of $Nd_2O_3$ and 4.459 g of $SiO_2$ (equivalent to approximately 41 mole % $Na_2O$, 4.5 mole % $Nd_2O_3$ and 54.5 mole % $SiO_2$) was heated in a platinum crucible quickly to 950° C., then heated to 1300° C. and held there for 16 hours; finally, it was quenched rapidly by dipping the platinum crucible into cold water. A piece of the glass was melted and fabricated into a bar and its ionic conductivity was measured:

$\sigma_{200}=1.3\times 10^{-4}$ ohm$^{-1}$ cm$^{-1}$ and
$\sigma_{300}=1.4\times 10^{-3}$ ohm$^{-1}$ cm$^{-1}$.

The remainder of the glass was comminuted to a fine powder and pressed into a disc which was heated to 920° C. for 16 hours and then quenched. The ionic conductivity was found to be: $\sigma_{200}=4.2\times 10^{-3}$ ohm$^{-1}$ cm$^{-1}$ and $\sigma_{300}=1.6\times 10^{-2}$ ohm$^{-1}$ cm$^{-1}$. This example demonstrates the significant increase in conductivity which can be obtained upon devitrifying the glass of the invention to form a glass-ceramic of the invention. This disc material was found to have an X-ray diffraction pattern similar to that of the product of Example 1, characteristic of the cubic $Na_9NdSi_6O_{18}$.

An analogue was prepared in which the $Nd_2O_3$ was replaced by $Pr_4O_{11}$. Both of these 9:1:6 compositions begin to show a tetragonal distortion for samples heated at 900° C. or below, but have the cubic diffraction pattern if heated at 950° or above. Table III gives the lattice cell edges for both compositions heated at 950° C. and 900° C. for 16 hours.

TABLE III
EFFECT OF TEMPERATURE ON LATTICE CONSTANTS FOR $Na_9PrSi_6O_{18}$ AND $Na_9NdSi_6O_{18}$

| Composition | Temp., °C. | Cell, a (nm) |
|---|---|---|
| $Na_9PrSi_6O_{18}$ | 950 | Cubic, 1.5294 |
| " | 900 | Tetra, a = 1.5292 |
|  |  | c = 1.5203 |
| $Na_9NdSi_6O_{18}$ | 950 | Cubic, 1.5279 |
| " | 900 | Tetra, a = 1.5284 |
|  |  | c = 1.5197 |

EXAMPLE 7

An intimate mixture of 9.539 g of $Na_2CO_3$, 2.258 g of $Y_2O_3$ and 7.210 g of $SiO_2$ (equivalent to approximately 41 mole % $Na_2O$, 4.5 mole % $Y_2O_3$ and 54.5 mole % $SiO_2$) was heated in a platinum crucible to 1400° C., held there for 8 hours, and then quenched. The resultant glass had undissolved particulate matter embedded in it. The material was comminuted to a fine powder and reheated to 1400° C., held there for 8 hours, and then quenched. A clear glass was obtained. A piece of the glass was melted and fabricated into a bar; the conductivity was found to be: $\sigma_{200}=1.9\times 10^{-4}$ ohm$^{-1}$ cm$^{-1}$ and $\sigma_{300}=1.5\times 10^{-3}$ ohm$^{-1}$ cm$^{-1}$.

The remainder of the glass was comminuted to a fine powder. Four discs were prepared and then heated at 950° C., 920° C., 820° C., and 725° C., respectively, for 16 hours. Each devitrified disc gave an X-ray diffraction pattern characteristic of the cubic phase. Their conductivities are given in Table IV. This example thus shows the increase in ionic conductivity which can be obtained by devitrifying the glass.

TABLE IV
CONDUCTIVITY OF GLASS AND DEVITRIFIED $Na_9YSi_6O_{18}$ -GLASS OBTAINED AT DIFFERENT TEMPERATURES

| Conditions | $\sigma_{200}$ ohm$^{-1}$ cm$^{-1}$ | $\sigma_{300}$ ohm$^{-1}$ cm$^{-1}$ |
|---|---|---|
| Glass | $1.9\times 10^{-4}$ | $1.5\times 10^{-3}$ |
| 750° C. | $3.4\times 10^{-5}$ | $2.5\times 10^{-4}$ |
| 820° C. | $8\times 10^{-4}$ | $4\times 10^{-3}$ |
| 920° C. | $1.4\times 10^{-3}$ | $4.8\times 10^{-3}$ |
| 950° C. | $1.8\times 10^{-3}$ | $6\times 10^{-3}$ |

EXAMPLE 8

An intimate mixture of 27.88 g of $Na_2CO_3$, 8.40 g of $Fe_2O_3$ and 25.289 g of $SiO_2$ (equivalent to approximately 36 mole % $Na_2CO_3$, 7 mole % $Fe_2O_3$ and 57 mole % $SiO_2$) was heated in a platinum crucible to 1100° C., held there for 16 hours and then quenched. A piece of the glass was fabricated into a bar and the conductivity was found to be : $\sigma_{200}=2.7\times 10^{-5}$ ohm$^{-1}$ cm$^{-1}$ and $\sigma_{300}=3\times 10^{-4}$ ohm$^{-1}$ cm$^{-1}$.

EXAMPLE 9

An intimate mixture of 4.770 g of $Na_2CO_3$, 0.799 g of $Fe_2O_3$ and 3.605 g of $SiO_2$ (equivalent to approximately 41 mole % $Na_2CO_3$, 4.5 mole % $Fe_2O_3$ and 54.5 mole % $SiO_2$) was heated in a platinum crucible at 1300° C. for 8 hours and then quenched in cold water. A dark brown glass was obtained. A piece of the glass was fabricated into a bar and the conductivity was found to be: $\sigma_{200}=6\times 10^{-5}$ ohm$^{-1}$ cm$^{-1}$ and $\sigma_{300}=1\times 10^{-3}$ ohm$^{-1}$ cm$^{-1}$. Devitrified samples of this glass showed rhombohedral $Na_5FeSi_4O_{12}$ plus $Na_2CO_3$; none of the prominent X-ray lines of the cubic phase, a typical example of which is reflected in Table I, was detected.

EXAMPLE 10

An intimate mixture of 2.547 g of $Na_2CO_3$, 1.024 g of $Y_2O_3$, 0.144 g of $HfO_2$ and 2.343 g of $SiO_2$ (equivalent to approximately 35.2 mole % $Na_2O$, 6.6 mole % $Y_2O_3$, 1.0 mole % $HfO_2$ and 57.2 mole % $SiO_2$) was heated to melting at about 1400° C. in a platinum crucible and then allowed to cool in the furnace. The resultant mass was comminuted to a fine powder, by milling in an agate planetary mill for 1 hour, and then heated to 1100° C. and held there for 16 hours; it was then quenched and comminuted to a fine powder. The X-ray diffraction pattern of the powder was similar to that for the product of Example 3 and indicates the presence of only the rhombohedral composition, $Na_{4.9}Y_{0.9}Hf_{0.1}Si_4O_{12}$.

EXAMPLES 11-15

The glass compositions of these examples contain no rare earth element. The number of moles of Na, (M'+M''), and Si are approximately in the ratio of 9:1:6. The grams of starting materials and the equivalent oxide mole percentages are shown in Tables V and VI, respectively. The intimately mixed starting materials were heated in a platinum crucible to 1400° C. and held there for about 16 hours to obtain a clear liquid. The crucible was placed in cold water to quench the liquid. Pieces of the resultant glasses were fabricated into bars and the measured conductivities are also shown in Table VI.

TABLE V

| Example No. | Na$_2$CO$_3$ g | MgO g | ZrO$_2$ g | SiO$_2$ g | CaO g | SrCO$_3$ g | BaCO$_3$ g |
|---|---|---|---|---|---|---|---|
| 11 | 9.539 | 0.403 | 1.232 | 7.210 | — | — | — |
| 12 | " | 0.202 | " | " | 0.280 | — | — |
| 13 | " | — | " | " | 0.561 | — | — |
| 14 | " | — | " | " | — | 1.476 | — |
| 15 | " | — | " | " | — | — | 1.974 |

TABLE VI

| Example No. | Mole % | | | | | | |
|---|---|---|---|---|---|---|---|
| | Na$_2$O | MgO | ZrO$_2$ | SiO$_2$ | CaO | SrO$_{2Z}$ | BaO |
| 11 | 39.1 | 4.35 | 4.35 | 52.2 | — | — | — |
| 12 | " | 2.18 | " | " | 2.18 | — | — |
| 13 | " | — | " | " | 4.35 | — | — |
| 14 | " | — | " | " | — | 4.35 | — |
| 15 | " | — | " | " | — | — | 4.35 |

| Example No. | $\sigma_{200}$ ohm$^{-1}$ cm$^{-1}$ | $\sigma_{300}$ ohm$^{-1}$ cm$^{-1}$ |
|---|---|---|
| 11 | $1.2 \times 10^{-4}$ | $1.5 \times 10^{-3}$ |
| 12 | $1.15 \times 10^{-4}$ | $1.4 \times 10^{-3}$ |
| 13 | $9 \times 10^{-5}$ | $1.1 \times 10^{-3}$ |
| 14 | $8 \times 10^{-5}$ | $1.1 \times 10^{-3}$ |
| 15 | $7 \times 10^{-5}$ | $9 \times 10^{-4}$ |

EXAMPLES 16-19

An intimate mixture of 29.50 g of Na$_2$CO$_3$, 10.458 g of Nd$_2$O$_3$ and 22.296 g of SiO$_2$ (equivalent to approximately 40.8 mole % Na$_2$CO$_3$, 4.6 mole % Nd$_2$O$_3$ and 54.6 mole % SiO$_2$) was heated to 1300° C., to obtain a clear liquid, and then quenched in cold water. The 9:1:6 glass (so designated to reflect the ratio of the number of moles of Na:Nd:Si) was then comminuted to a powder and mixed with various amounts of NaF, as indicated in Table VII, heated to 1300° C. and held there for 16 hours, and then quenched in cold water. Pieces of the resultant glasses were fabricated into bars and their conductivities were measured (listed in Table VII). The glass obtained in Example 19 was not completely clear, indicating that some of the NaF remained dissolved.

TABLE VII

| Example No. | Glass g | NaF g | Moles NaF/Moles Glass |
|---|---|---|---|
| 16 | 5 | .013 | 1/20 |
| 17 | 5 | .026 | 2/20 |
| 18 | 5 | .039 | 3/20 |
| 19 | 5 | .052 | 4/20 |

| Example No. | $\sigma_{200}$ ohm$^{-1}$ cm$^{-1}$ | $\sigma_{300}$ ohm$^{-1}$ cm$^{-1}$ |
|---|---|---|
| 16 | $1.1 \times 10^{-4}$ | $1.2 \times 10^{-3}$ |
| 17 | $1.3 \times 10^{-4}$ | $1.4 \times 10^{-3}$ |
| 18 | $1.5 \times 10^{-4}$ | $1.5 \times 10^{-3}$ |
| 19 | $1.7 \times 10^{-4}$ | $1.6 \times 10^{-3}$ |

EXAMPLE 20

A glass containing about 33 mole % Na$_2$O$_3$, 17 mole % CaO and 50 mole % SiO$_2$ was prepared by melting appropriate amounts of Na$_2$CO$_3$, CaO and SiO$_2$ together in a platinum crucible held at 1400° C. for several hours and quenching the melt rapidly in a water bath. A piece of the resultant glass was fabricated into a suitable shape, using conventional techniques, and its ionic conductivity was measured and found to be $\sigma_{300} = 2.3 \times 10^{-4}$ ohm$^{-1}$ cm$^{-1}$.

BEST MODE FOR CARRYING OUT THE INVENTION

The best way to practice the invention disclosed herein is illustrated by Examples 1, 3 and 6 and Experiments 3 and 4, although practical utility is not limited to these examples.

INDUSTRIAL APPLICABILITY

The glass, glass-ceramic and substantially cubic crystalline material of this invention are useful as a solid electrolyte in electrochemical applications, such as in primary and secondary batteries and in the electrowinning of metallic sodium. They are especially useful in secondary batteries in which the solid electrolyte is in the form of hollow fibers or bottle-like containers. They are also useful, when coated on various substrates, as the solid electrolyte in a solid state thick-film battery. The composition of this invention, including the novel crystalline phase, is also useful as a solid electrolyte in the electrowinning of sodium.

I claim:

1. Na$^{30}$-conducting glass of the composition comprising aNa$_2$O, bSiO$_2$, cM$_2$O$_3$, dM'O$_2$ and eM"O wherein, based on the combined molar amounts totaling 100%, a is 32–41 mole %, b is 50–58 mole %, the ratio a/b is 0.575/1 to 0.760/1, c is 0–8 mole %, d is 0–7 mole %, e is 0–17 mole %, 2c+d+e is at least 8.7 mole %, M is one or more elements selected from the group consisting of the rare earth elements, yttrium and iron, M' is Zr or Hf and M" is Mg, Ca, Sr or Ba.

2. The Na$^+$-conducting glass of claim 1 in which a is about 41 mole %, b is about 54.5 mole %, c is about 4.5 mole % and d and e are zero.

3. Na$^+$-conducting glass prepared from NaF and the glass of claim 2, the amount of NaF being up to 0.2 mole/mole of glass of claim 2.

4. The Na$^+$-conducting glass of claim 2 in which M is Gd.

5. The Na$^+$-conducting glass of claim 2 in which M is Nd.

6. The Na$^+$-conducting glass of claim 2 in which M is Y.

7. The Na$^+$-conducting glass of claim 2 in which M is Fe.

8. The Na$^+$-conducting glass of claim 1 in which a is about 39.1 mole %, b is about 52.5 mole %, c is zero, d is about 4.35 mole % and e is about 4.35 mole %.

9. The Na$^+$-conducting glass of claim 8 in which M' is Zr.

10. The Na$^+$-conducting glass of claim 8 in which M" is Mg.

11. The Na$^+$-conducting glass of claim 8 in which M" is half Mg and half Ca.

12. The Na$^+$-conducting glass of claim 8 in which M" is Ca.

13. The Na$^+$-conducting glass of claim 8 in which M" is Sr.

14. The Na$^+$-conducting glass of claim 8 in which M" is Ba.

15. The Na$^+$-conducting glass of claim 1 in which a is about 35–36 mole %, b is about 57–57.2 mole %, c is about 6.4–7.2 mole %, d is about 0–1.5 mole % and e is zero.

16. The Na$^+$-conducting glass of claim 15 in which M is Gd and M' is Zr.

17. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting glass of claim 1.

18. The electrochemical device of claim 17 which is a galvanic cell.

19. The galvanic cell of claim 18 in which the solid electrolyte is in the form of hollow fibers.

20. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting glass of claim 2.

21. The electrochemical device of claim 20 which is a galvanic cell.

22. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting glass of claim 8.

23. The electrochemical device of claim 22 which is a galvanic cell.

24. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting glass of Claim 15.

25. The electrochemical device of claim 24 which is a galvanic cell.

26. Electrochromic display device wherein the solid electrolyte consists essentially of the Na$^+$-conducting glass of claim 1.

27. Na$^+$-conducting glass-ceramic comprising devitrified glass of claim 1.

28. The Na$^+$-conducting glass-ceramic of claim 27 in which a is about 41 mole %, b is about 54.5 mole % and c is about 4.5 mole % and d and e are zero.

29. The Na$^+$-conducting glass-ceramic of claim 28 in which M is Gd.

30. The Na$^+$-conducting glass-ceramic of claim 28 in which M is Nd.

31. The Na$^+$-conducting glass-ceramic of claim 28 in which M is Y.

32. The Na$^+$-conducting glass-ceramic of claim 28 in which M is Fe.

33. The Na$^+$-conducting glass ceramic of claim 27 in which a is about 35–36 mole %, b is about 57–57.2 mole %, c is about 6.4–7.2 mole %, d is about 0–1.5 mole % and e is zero.

34. The Na$^+$-conducting glass-ceramic of claim 33 in which M is Gd and d is zero.

35. The Na$^+$-conducting glass-ceramic of claim 33 in which M is Fe and d is zero.

36. The Na$^+$-conducting glass-ceramic of claim 33 in which M is Gd and M' is Zr.

37. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting glass-ceramic of claim 27.

38. The electrochemical device of claim 37 which is a galvanic cell.

39. The galvanic cell of claim 38 wherein the solid electrolyte is in the form of a film or coating on a substrate.

40. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting glass-ceramic of claim 28.

41. The electrochemical device of claim 40 which is a galvanic cell.

42. The galvanic cell of claim 41 wherein the solid electrolyte is in the form of a film or coating on a substrate.

43. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting glass-ceramic of claim 33.

44. The electrochemical device of claim 43 which is a galvanic cell.

45. The galvanic cell of claim 44 wherein the solid electrolyte is in the form of a film or coating on a substrate.

46. Electrochromic display device wherein the solid electrolyte consists essentially of the Na$^+$-conducting glass-ceramic of claim 27.

47. Na$^+$-conducting composition having the substantially cubic crystalline structure of the formula Na$_{9-x-n-z/2}$M$_{1+x/3-2y-n-z/2}$M'$_{y+n}$M''$_{y+z}$Si$_6$O$_{18}$ wherein M is one or more elements selected from the group consisting of the rare earth elements, yttrium and iron, M' is Zr or HF and M'' is Mg, Ca, Sr or Ba, x is 0 to 1.5, y is 0 to 0.5, z is 0 to 2.0, n is 0 to 0.5 y+n$\leq$0.5 and y+z$\leq$2.0.

48. The Na$^+$-conducting composition of claim 47 having a cubic cell edge of about 15.2 Å (1.52 nm).

49. The Na$^+$-conducting composition of claim 48 in which a is about 41 mole %, b is about 54.5 mole %, c is about 4.5 mole % and d, e, x, y, z and n are zero.

50. The Na$^+$-conducting composition of claim 49 in which M is Gd.

51. The Na$^+$-conducting composition of claim 49 in which M is Nd.

52. The Na$^+$-conducting composition of claim 49 in which M is Y.

53. The Na$^+$-conducting composition of claim 48 in which a is about 36 mole %, b is about 57 mole %, c is about 7 mole %, x is 1.5 and d, e, y, z and n are zero.

54. The Na$^+$-conducting composition of claim 53 in which M is Gd.

55. In an electrochemical device having (a) two electrodes, one of which is a sodium-containing electrode capable of supplying sodium ions, (b) a solid electrolyte separating the two electrodes and (c) an inert connecting electrical connector to complete an electrical circuit between the two electrodes, the improvement wherein the solid electrolyte consists essentially of the Na$^+$-conducting composition of claim 47.

56. The electrochemical device of claim 55 which is a galvanic cell.

* * * * *

UNITED STATES PATENT OFFICE
CERTIFICATE OF CORRECTION

PATENT NO. : 4,223,077
DATED : September 16, 1980
INVENTOR(S) : Barry E. Taylor

It is certified that error appears in the above-identified patent and that said Letters Patent are hereby corrected as shown below:

Column 16, line 23, Claim 1, "$Na^{30}$" should read -- $Na^+$ --.

Signed and Sealed this

Third Day of November 1981

[SEAL]

Attest:

Attesting Officer

GERALD J. MOSSINGHOFF

Commissioner of Patents and Trademarks